United States Patent
Russell

(10) Patent No.: US 8,808,863 B2
(45) Date of Patent: Aug. 19, 2014

(54) UV-CURABLE FLOOR SEALANTS

(75) Inventor: Geoffrey Russell, Odgen, UT (US)

(73) Assignee: Photokinetic Coatings & Adhesives, LLC, Ogden, UT (US)

( * ) Notice: Subject to any disclaimer, the term of this patent is extended or adjusted under 35 U.S.C. 154(b) by 167 days.

(21) Appl. No.: 13/387,104

(22) PCT Filed: Jul. 28, 2009

(86) PCT No.: PCT/US2009/004348
§ 371 (c)(1),
(2), (4) Date: Apr. 6, 2012

(87) PCT Pub. No.: WO2011/014139
PCT Pub. Date: Feb. 3, 2011

(65) Prior Publication Data
US 2012/0183784 A1    Jul. 19, 2012

(51) Int. Cl.
B32B 27/40 (2006.01)
C08F 2/48 (2006.01)
B29C 71/04 (2006.01)
C08J 3/28 (2006.01)
C08K 3/36 (2006.01)

(52) U.S. Cl.
USPC .................................. 428/423.1

(58) Field of Classification Search
USPC .......... 522/90, 97, 83; 524/457; 428/423.1, 428/424.2; 427/508
See application file for complete search history.

(56) References Cited

U.S. PATENT DOCUMENTS

| | | |
|---|---|---|
| 4,999,216 A | 3/1991 | Gaske et al. |
| 5,141,990 A | 8/1992 | McKoy et al. |
| 5,258,225 A | 11/1993 | Katsamberis |
| 5,425,970 A | 6/1995 | Lahrmann et al. |
| 5,667,227 A | 9/1997 | Boldt |
| 5,719,227 A | 2/1998 | Rosenberry et al. |
| 6,048,587 A | 4/2000 | Estrin |
| 6,197,844 B1 | 3/2001 | Hamrock et al. |
| 6,306,502 B1 | 10/2001 | Fukushima et al. |
| 6,413,618 B1 | 7/2002 | Parker et al. |
| 6,538,258 B1 | 3/2003 | Rau et al. |
| 6,632,446 B1 | 10/2003 | Hubbell et al. |

(Continued)

FOREIGN PATENT DOCUMENTS

| | | |
|---|---|---|
| EP | 0 869 154 | 10/1998 |
| JP | 2007 313872 | 12/2007 |
| WO | WO 2008077722 A1 * | 7/2008 |

OTHER PUBLICATIONS

International Preliminary Report on Patentability; PCT/US2009/004348; dated Jan. 31, 2012.

(Continued)

*Primary Examiner* — Thao T. Tran
(74) *Attorney, Agent, or Firm* — TraskBritt, P.C.

(57) ABSTRACT

Described is a UV-curable sealant composition, which is preferably a one part sealant. The one part sealant is made from urethane acrylate, acrylate ester, precipitated silica, and photoinitiator. More specifically, the one part sealant is made from about 15-35 weight percent aliphatic and/or alicyclic urethane acrylates, about 40-70 weight percent of acrylate esters, about 0-10 weight percent of precipitated silica, and about 3-8 weight percent of photoinitiator. Also described are methods of applying UV-curable sealant composition to a surface such as a floor and UV curing the UV-curable sealant composition, thereby extending the life of the surface.

16 Claims, 1 Drawing Sheet

(56) References Cited

U.S. PATENT DOCUMENTS

| | | | |
|---|---|---|---|
| 6,676,795 B1 * | 1/2004 | Levandoski | 156/272.2 |
| 6,761,127 B2 | 7/2004 | Field et al. | |
| 6,852,768 B2 | 2/2005 | Jin et al. | |
| 6,855,403 B2 | 2/2005 | Tysak | |
| 6,911,263 B2 | 6/2005 | Kauffman et al. | |
| 6,955,834 B2 | 10/2005 | Rohrbaugh et al. | |
| 6,972,317 B2 | 12/2005 | Weinert et al. | |
| 7,022,257 B1 | 4/2006 | Ohkido et al. | |
| 7,066,998 B2 | 6/2006 | Rohrbaugh et al. | |
| 7,151,123 B2 | 12/2006 | Ramsey | |
| 7,195,812 B2 | 3/2007 | Sigel et al. | |
| 7,276,265 B2 | 10/2007 | Sigel et al. | |
| 7,361,401 B2 | 4/2008 | Desai et al. | |
| 7,452,956 B2 | 11/2008 | Cheng et al. | |
| 7,527,852 B2 | 5/2009 | Sigel et al. | |
| 2002/0164434 A1 | 11/2002 | Tarvin et al. | |
| 2003/0032571 A1 | 2/2003 | Olson et al. | |
| 2004/0170793 A1 | 9/2004 | Linden et al. | |
| 2006/0032175 A1 | 2/2006 | Chen et al. | |
| 2006/0078742 A1 | 4/2006 | Kauffman et al. | |
| 2006/0167208 A1 * | 7/2006 | Garner et al. | 528/84 |
| 2007/0066703 A1 | 3/2007 | Shinohara et al. | |
| 2007/0202266 A1 | 8/2007 | Bober et al. | |
| 2007/0202342 A1 | 8/2007 | Whiteford et al. | |
| 2008/0085396 A1 | 4/2008 | Bober et al. | |
| 2008/0207581 A1 | 8/2008 | Whiteford et al. | |
| 2009/0136672 A1 * | 5/2009 | Panz et al. | 427/397.7 |
| 2010/0093884 A1 * | 4/2010 | Spyrou et al. | 522/71 |

OTHER PUBLICATIONS

International Search Report PCT/US2009/004348 dated Mar. 31, 2010.

* cited by examiner

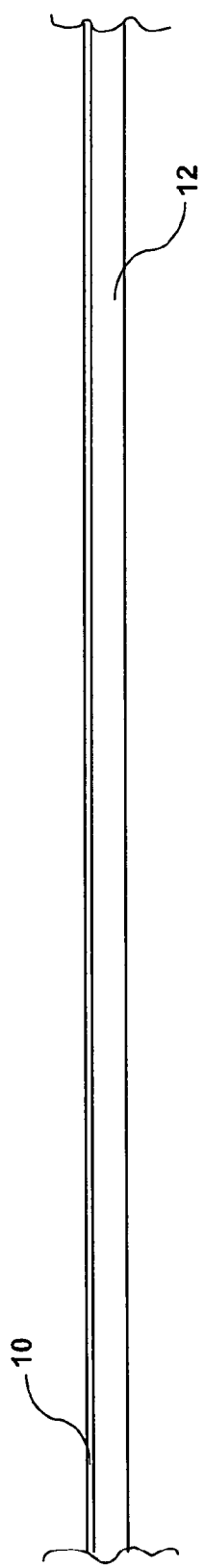

UV-CURABLE FLOOR SEALANTS

CROSS-REFERENCE TO RELATED APPLICATION

This is a national phase entry under 35 U.S.C. §371 of International Patent Application PCT/US2009/004348, filed Jul. 28, 2009, published in English as International Patent Publication WO 2011/014139 A1 on Feb. 3, 2011.

TECHNICAL FIELD

The present invention relates to coatings to floor surfaces and methods for applying coatings to floor surfaces. More particularly, the present invention relates to floor coatings and methods for applying and curing floor surface coatings by application of radiation.

BACKGROUND

Floor coatings provide numerous advantages. For example, these coatings may be used to protect the underlying floor surface from damage associated with dirt, wear, exposure, or spillage. These coatings may also be used to provide a more aesthetically pleasing appearance and/or to improve overall ambient lighting (e.g., from increased floor reflection). Still further, by sealing the underlying floor surface, these coatings may simplify subsequent floor cleaning procedures. These coatings are typically applied as a liquid which is subsequently cured to form a durable layer over the floor surface. Curing is generally achieved through thermal treatment and/or exposure to ambient conditions.

However, even with these advantages, these coatings do have drawbacks. For instance, cure times for many conventional floor coatings can be substantial, e.g., anywhere from several hours to several days. As a result, floor traffic may be significantly interrupted during the curing process. While such interruptions may be acceptable in limited circumstances (e.g., new construction, remodeling), long cure times may make application of these coatings difficult, or, in some instances, impracticable.

Floor finishing methods and compositions are disclosed in U.S. Patent Publication 20030032571 to Olson et al. (Feb. 13, 2003), the contents of which are incorporated herein by this reference. See, also, U.S. Patent Publication 20020164434 A1 to Tarvin et al. (Nov. 7, 2002) and U.S. Pat. No. 4,999,216, the contents of the entirety of both of which are incorporated herein by this reference To reduce these lengthy cure times, some floor coating materials are formulated to cure relatively instantly when subjected to ultraviolet (UV) radiation as seen in U.S. Pat. No. 6,761,127, the contents of which are incorporated herein by this reference. These coatings typically include photo-responsive components that cure when exposed to particular wavelengths of UV radiation. In addition to reducing cure time, UV-curable coatings may also reduce material costs (e.g., by eliminating solvents) and/or operational costs (e.g., no mixing and no conventional thermal curing equipment required).

While they may permit relatively instant curing, many conventional methods for UV curing of floor coatings use a single wavelength of UV radiation. These methods require a UV-curing apparatus having substantial power requirements. As a result, wide acceptance of these coatings and their associated curing apparatus has not been achieved.

Traditional coatings and adhesives use organic solvents and water to reduce the viscosity of coating resins enough to allow coatings to be sprayed, brushed, rolled or otherwise applied to a surface. Heat and time are required to evaporate the solvent and/or water from the coating and to coalesce and cure the coating after it is dry. The traditional way is inefficient and has several negative consequences, including: substantial application and drying times leading to production and operational down time and inefficiency, emission of dangerous Volatile Organic Compounds (VOCs) from solvent based products, off-gassing of other greenhouse gases into the atmosphere, emission of carbon dioxide and other combustion products from application equipment and energy sources.

DISCLOSURE OF THE INVENTION

Disclosed is a UV-curable sealant composition useful, for among other things, Vinyl Composite Tile ("VCT"), which is a one part sealant. The one part sealant comprises one or more aliphatic and/or alicyclic urethane acrylates, acrylate esters, precipitated silica or other inorganic and organic pigments, and photoinitiators. More specifically, the one part sealant is preferably made from about 15-35 weight percent aliphatic and/or alicyclic urethane acrylate, about 40-70 weight percent of acrylate esters, about 0-10 weight percent of precipitated silica, and about 3-8 weight percent of photoinitiator.

In another exemplary embodiment, the UV-curable sealant composition is cured by UV-radiation to form a UV-cured sealant composition. The UV-cured sealant composition is slip resistant, stain resistant, solvent resistant, and abrasion resistant. The UV-cured sealant composition also has antimicrobial and antibacterial properties.

In another exemplary embodiment, a method of applying a one part sealant composition to a VCT floor is taught. A UV-curable composition is deposited onto a VCT floor surface. The UV-curable composition is made from about 15-35 weight percent of aliphatic and/or alicyclic urethane acrylates, about 40-70 weight percent of acrylate esters, about 0-10 weight percent precipitated silica, and about 3-8 weight percent photoinitiator. The UV-curable one part sealant composition is substantially cured, thus sealing the floor and extending the VCT floor's life.

BRIEF DESCRIPTION OF THE DRAWING

FIG. 1 is a view of a VCT floor coated with a UV-curable coating composition.

MODE(S) FOR CARRYING OUT THE INVENTION

Generally speaking, the present invention provides a liquid coating composition and a process for applying the liquid coating composition 10 and UV curing of the liquid coating composition 10 applied over a floor surface 12 (FIG. 1). Floor surfaces may include but are not limited to, concrete, ceramic tile, wood, vinyl, and VCT flooring. Floor coatings as described herein may be used to coat entire floor surfaces as well as to repair localized areas, e.g., to fill cracks.

The liquid coating composition may be applied to the floor in most any conventional manner, such as with a roller. After application, the coating is cured to a durable solid state by application of radiation from a mobile source of UV radiation. While the thickness of the applied liquid floor coating composition may vary depending on the particular application and on the condition of the floor surface, thicknesses from about 50 to about 100 microns are common but thicknesses up to and beyond 125 microns are contemplated.

To promote quick curing with reduced power requirements, coatings include components that may be reactive to, i.e., cured by, UV radiation of one or more different wavelengths. The medium pressure mercury arc lamp on the cure machine emits a broad spectrum of UV-A, UV-B, and UV-C radiation. The photoinitiator(s) in the coating are responsive to one or more of the wavelengths emitted by the mercury arc lamp. For example, UV radiation in the wavelength range of about 325 nanometers (nm) to about 400 nm provides what is known as deep curing. Deep curing cures that portion of the coating closest to the floor surface and promotes adhesion with the floor. Simultaneous with the application of the first wavelength, UV radiation in the wavelength range of about 240 nm to about 300 nm is produced by the arc lamp, and provides surface curing and assists in complete curing of the floor coating.

While described with respect to specific wavelengths of UV radiation, other wavelengths are certainly possible. In fact, coatings responsive to most any wavelengths are possible, provided that the UV reactive components within the UV-curable sealant coating composition are matched to the particular wavelengths of emitted UV radiation.

By providing multiple wavelength UV radiation as described herein, the present coating compositions and methods are capable of relatively instantly curing floor coatings with minimal power input. As a result, they may be powered from e.g., a 220-volt, 20-ampere wall outlet or, alternatively, from a separate generator. The coating composition may be cured by a portable UV irradiator with, for example, 150 Watts/inch (2.54 cm) of UV irradiation. However, depending on the exact coating composition, ranges below and above 150 Watts/inch (2.54 cm) of UV irradiation may be used. One benefit of instantly curing the UV-curable sealant composition is that the floor becomes available for use right after the curing process is finished.

"Instant curing" is defined herein to include substantial curing of the coating composition relatively instantly, e.g., within a few seconds or less. "Substantial curing" or "substantially cured" includes most any degree of curing or hardening of the coating material that results in at least a tack-free (e.g., not wet) coating surface. Unless stated otherwise herein, the terms "cured" and "curing" are used interchangeably with the terms "substantially cured" and "substantial curing."

The term "a UV-curable sealant composition" used in the following description refers to a composition that is a liquid material and that has not been fully cured yet. The term a "UV-cured sealant composition" used in the following description refers to a composition that formed a cured or substantially cured film.

According to certain embodiments, a UV-curable sealant composition is prepared. The UV-curable sealant composition is prepared as a one part sealant. Such a one part sealant includes e.g., 25 weight percent urethane acrylate, 65 weight percent acrylate esters, 5 weight percent precipitated silica, and/or 5 weight percent photoinitiator. A one-part sealant has significant advantages over two-part coating systems such as catalyzed urethane or urea coatings or two-part epoxy systems. These advantages include: (1) increased working time, (2) lower toxicity, (3) elimination of careful measurement of components, and (4) longer shelf life.

In some embodiments, the one part sealant includes about 15-35 weight percent of urethane acrylate (preferably 20-30 weight percent), about 40-70 weight percent of acrylate esters (preferably 50-60 weight percent), about 0-10 weight percent of precipitated silica (preferably 2-8 weight percent), and about 3-8 weight percent of a photoinitiator (preferably 5-6 weight percent). UV-curable polymers forming materials useful in applying to surfaces, such as VCT, are readily commercially available. For example, urethane acrylate is available under the trade designation Genomer 4316 from Rahn USA, acrylate esters are available under the trade designation tripropylene glycol diacrylate (TPGDA), ethoxylated nonylphenol monoacrylate, ethoxylated trimethylolpropane triacrylate (EO-TMPTA) and ethoxylated tetrahydrofurfuryl acrylate from Rahn USA, Sartomer and Cytec Surface Specialties, precipitated silica is available under the trade designation Syloid Rad 2005 from WR Grace, and photoinitiators useful in application of the invention is available under the trade designation Genocure DMHA, Genocure CPK, Genocure TPO and Genocure BP from Rahn USA.

One advantage of the aliphatic urethane acrylates is that they minimize yellowing after curing. The selection of the aliphatic urethane acrylates is based upon viscosity, cure speed and cured properties (tensile strength, elongation, adhesion, etc.). According to some embodiments, polyester acrylates may be used as part of the oligomer content of the coating. However, polyester acrylates have poorer resistance to yellowing and aging.

Exemplary urethane acrylates which may be used in the UV-curable composition include, but are not limited to are aliphatic urethane acrylates available under the designation CN 3103, 9002, 9004, 9005, 9006, 9007, 9178, 9290US, 940, 9788, 989, 9893, 996, 9009, 9010, 3211, 9001, 2920, 3102, 959, 9011, 929, 962, 965, 991, 980, 981, 964, 968, 983, 984, 9019, 2921, 2922, 9008, 9024, 9013, and 9018, commercially available from Sartomer, Inc. on the world wide web at sartomer.com, Exemplary acrylate esters which may be used in the UV-curable composition include, but are not limited to Methyl acrylate, Ethyl acrylate, Butyl acrylate, 2-Ethylhexyl acrylate, Methyl methacrylate, Dimethylaminoethyl methacrylate, Ethyl methacrylate, Butyl methacrylate, Hexyl methacrylate, Decyl-octyl methacrylate, Lauryl methacrylate, Stearyl methacrylate Exemplary photoinitiators which may be used in the UV-curable composition include, but are not limited to 1-phenyl-2-hydroxy-2-methyl-1-propanone; oligo {2-hydroxy-2 methyl-1-[4-(methylvinyl)phenyl]propanone}; 2-hydroxy 2-methyl 1-phenyl propan-1 one; bis(2,6-dimethoxybenzoyl)-2,4,4-trimethylpentyl phosphine oxide; 2,4,6-trimethyl benzoyl-diphenyl phosphine oxide; 2-methyl-1-[4(methylthio)-2-morpholinopropan]-1-one; 1-hydroxycyclohexyl phenyl ketone; 4-(2-hydroxy) phenyl-2-hydroxy-2-(methylpropyl)ketone; 2,2-dimethoxy-2-phenyl acetophenone; benzophenone; benzoic acid; (n-5,2,4-cyclopentadien-1-yl)[1,2, 3,4,5,6-n)-(1-methylethyl)benzene]-iron(+) hexafluorophosphate; 4-(dimethyl amino)-ethyl ether; and mixtures thereof. Commercially available photoinitiators include 1-hydroxycyclohexylphenylketone (IRGACURE™ 184, commercially available from Ciba Specialty Chemicals); a 50:50 weight basis mixture of 1-hydroxycyclohexylphenylketone and benzophenone (IRGACURE™ 500, commercially available from Ciba Specialty Chemicals); bis(n,5, 2,4-cyclopentadien-1-yl)-bis[2,6-difluoro-3-(1H-pyrol-1-yl) phenyl]titanium (IRGACURE™ 784 DC, commercially available from Ciba Specialty Chemicals); 2-benzyl-2-N,N-dimethylamino-1-(4-morpholinophenyl)-1-butanone (IRGACURE™ 369, commercially available from Ciba Specialty Chemicals Inc.); and the EB3, KB1, TZT, KIP 100F, ITX, EDB, X15 and KT37 series of ESACURE™ photoinitiators (commercially available from Sartomer Inc.).

Even though the prepared UV-curable sealant composition may be in a liquid, it may include up to about 100% solids and produces a tough and elastic film once applied to flooring. In a substantially dust free environment, the UV-curable sealant composition will remain wet indefinitely. Any composition in the range given will function adequately. Table 1 illustrates some of the exemplary technical material properties of the UV-curable sealant composition.

TABLE 1

| Property | Value |
| --- | --- |
| Specific Gravity | 1.05-1.10 |
| Flash Point, Seta Closed Cup, ° F. (° C.) | >200 (>93) |
| Density, lb/gal. (kg/L) | 9.2 (1.1) |
| VOC, g/L | 0 |
| Coverage, sq. ft./gal. (m$^2$/L) | 500 (12.3) |
| Coating, Thickness | 50-100 microns |
| Shipping Category | UN-1099, Non-regulated |
| Gloss Levels | High Gloss and Satin Finish |

In addition to being UV reactive, the instant floor coating materials may include conventional curing agents which permit curing by exposure to ambient light, e.g., air oxidation and/or exposure to visible light and/or atmospheric humidity. As a result, floor areas missed or not completely cured by the UV curing apparatus, e.g., corners or filled cracks in the floor that are too deep to cure initially, may still cure over time. Furthermore, the UV-curable coating composition may be used in both hot and cold environments allowing for universal application possibilities.

For a description of commercially available urethane acrylate, photoinitiators, and acrylate esters, oligomers, see the incorporated U.S. Patent Publication 20020164434 A1 to Tarvin et al.

Various additives may optionally be included in the floor coating material. For example, in many applications, protection against static electricity is desirable. In these instances, indium tin oxide, quaternary ammonium compounds, graphite or other conductive materials may be added to the coating. A conductive material additive is particularly beneficial as it provides the coating with electrically conductive properties which eliminate, or at least reduce, static electricity. Moreover, this additive does not interfere with the curing process and typically will not affect the coating color.

Other additives which may be included with the floor coating material include colorants (powder or liquid form) and texturing components. Texturing components may include, for example, high wear abrasive grits. These grits, in addition to adding texture to the floor coating, may also provide no-slip surface and may further increase durability and usable wear life of the floor coating. While the actual texturing component(s) used may include most any grit (e.g., silicon carbide) or flake material, one preferred material is crystallized aluminum oxide. Crystallized aluminum oxide provides not only excellent durability/wear resistance, but also creates an observable difference in appearance between cured and uncured portions of the floor coating. This is beneficial to an operator controlling the curing apparatus (further described below) as he or she can clearly delineate that portion of the floor coating that has been cured from that portion that has not.

However, even though any of these additives may be included in the coating composition, they are not required to achieve results such as a no-slip surface, stain resistance, solvent resistance, and/or abrasion resistance. It was found that the UV-cured sealant composition, including urethane acrylate, acrylate ester, precipitated silica, and/or photoinitiator, provides a slip resistant surface even in the absence of additives often used (e.g., grits, additional texturing, or volatile organic compounds) to achieve a slip resistant surface, stain resistance, solvent resistance, and/or abrasion resistance.

According to certain embodiments, the floor coating material includes photoinitiators that cause the floor coating material to form a hard, durable floor coating once exposed to UV radiation in wavelengths from about 254 nm to 350 nm. One benefit of curing the floor with UV radiation at a wavelength of 254 nm is that this specific wavelength may provide some degree of germicidal, (e.g., antibacterial or antimicrobial) protection to the UV cured area. However, these wavelengths are variable as long as the wavelengths of the respective UV reactive components of the floor coating material are matched to the emitted wavelengths of UV radiation from the curing apparatus. Since the coating is hydrophobic and highly cross-linked, it provides a further barrier to microbial growth since it provides no nutrients or water to support growth. When water and nutrients are supplied by contamination on the surface of the coating, they can easily be removed by scrubbing since attachment to the surface of the cured film is very weak.

In certain embodiments, antibacterial or antimicrobial protection may be obtained because the UV-cured sealant composition presents a smooth surface for easy cleaning. Seal joints, where bacteria may grow, are also sealed and part of the smooth surface to further eliminate bacterial growth.

According to certain embodiments, the floor surface to be coated is first prepared to receive the UV-curable sealant composition. This preparation may vary depending on the floor type and condition. For example, in some situations, a previously applied floor coating may first need to be removed before a new UV-curable sealant composition may be applied. Removal may be accomplished in any number of ways. For instance, the coating may be softened with a solvent stripper and manually scraped off. Commercially available alkaline strippers may be used (for example, in conjunction with a sanding machine as described in U.S. Pat. No. 4,768,311, the contents of which are incorporated herein by this reference) to remove the old coating and prepare the floor surface. Some floors may further require scrubbing, vacuuming, and/or acid-etching to ensure the floor surface is clean and capable of forming a strong adhesive bond with the new coating.

In certain embodiments, the UV-cured sealant composition is non-yellowing and stain resistant. However, because the UV-cured sealant composition is generally non-yellowing, it does not have to be completely stripped from the surface before reapplication. When the original UV-cured sealant composition has become worn through use (for example, 6-18+ months after application), the floor with the original UV-cured sealant composition may be, e.g., lightly sanded with a 200 mesh screen or abrasive pad. However, in some embodiments, a new coat of the UV-cured sealant composition may be applied directly over to the old coat without any stripping. All of the particulates generated are removed by vacuuming or dry mopping. After the surface is dry, a new layer of the UV-curable sealant composition may be applied. Once applied, the UV-cured sealant composition can be touched up as needed or a new coat can be applied right on top of the existing surface.

The UV-cured sealant composition may be stain resistant to all types of common household, commercial, or industrial stains. In certain embodiments, the UV-cured sealant composition may be stain resistant to ketchup, mustard, vinegar, canola oil, grape juice, gum remover (mineral spirits, citrus oil and organic detergent), nail polish remover (acetone, water and propylene carbonate), isopropyl rubbing alcohol, bleach (full-strength sodium hypochlorite laundry bleach), and BETADINE® disinfectant.

Some of the material properties of the UV-cured composition are illustrated in Table 2 below. As shown in Table 2, the test methods utilized are according to the standards of ASTM International (originally known as the American Society for Testing and Materials) available on the world wide web at astm.org/Standard/index.shtml.

TABLE 2

| Property | Test Method | Result |
|---|---|---|
| Abrasion resistance Falling Sand | ASTM D968-05e1 | 4-10× better than conventional sealant |
| Stain resistance | ASTM D1308-02 | |
| BETADINE ® | | No effect |
| Bleach | | No effect |
| Tea | | No effect |
| Nail Polish remover | | No effect |
| Solvent Resistance | ASTM D5402-06 | |
| Acetone Double Rubs | | No effect |
| Crosshatch Adhesion | ASTM D3359-08 | 100%—3 pulls |
| Coefficient of Friction | ASTM D-2047 | |
| Dry | James Machine | 0.62 |
| Wet | Average of 12 cycles | 0.72 |

According to certain embodiments, the UV-curable sealant composition may be used on any VCT flooring. In certain embodiments, the UV-curable sealant composition may be used in, for example, hospitals, laboratories, and research facilities, schools, manufacturing facilities, retail stores, big box stores, government facilities, grocery stores, malls, warehouses, professional offices, lunchrooms, bathrooms, and restaurants.

While Volatile Organic Compounds (VOCs) and water can comprise up to 90% of traditional products, the UV-curable sealant composition contains zero VOCs or water. Furthermore, the UV-curable sealant composition is 100% reactive and cures instantly with ultraviolet light. Because of this, the UV-curable sealant composition offers many ongoing benefits and advantages such as efficiency and cost savings, energy savings and improved microbial and bacterial resistance. For example, facilities do not need to experience any down time from drying and buffing as with traditional coatings.

VOCs have been traditionally added to reduce the viscosity of the high molecular weight resins used in the coating. Once the coating spreads over the surface, the VOCs evaporate and leave a film of the resin and any additives on the surface. However, the UV-curable sealant composition uses medium molecular weight oligomers and low viscosity reactive monomers to achieve the desired coating viscosity. This allows the coating to spread over the surface without any evaporation of solvents. The use of VOCs also includes the disadvantage of needing to wait for the VOCs to evaporate before the surface becomes tack-free. This adds more time and energy consumption to completing the curing process.

According to certain embodiments, buffing is not required after curing of the UV-curable sealant composition. The UV-curable sealant composition may cure to a gloss or satin finish. In some embodiments, the gloss or satin finish is permanent.

The apparatus for curing the floor coating may be a mobile device designed to travel over the floor surface being coated. An example of such device is described in U.S. Pat. No. 6,761,127, the contents of which are incorporated herein by this reference. The apparatus may be a walk-behind device (push or self-propelled) or a ride-on device. Ride-on devices and self-propelled walk-behind devices may be advantageous where the operator desires to maintain a relatively constant speed, e.g., where more particular and consistent control of UV exposure is desired. In certain embodiments, the UV-curable sealant composition may cover approximately 500 square feet per gallon (12.3 square meters per liter). In some embodiments, a T-bar applicator may be used to cover 500 square feet per gallon (12.3 square meters per liter) of the UV-curable sealant composition.

Advantageously, floor coating compositions of the present invention may be cured at relatively low power as compared to most currently known UV floor coating systems. For example, some known UV curing systems require approximately 600 watts per inch (2.54 cm) of cured coating width. The UV-curable sealant composition in accordance with the present invention, however, may be cured with effective power consumption of no more than about 150 watts per inch (2.54 cm) of cured coating width ("cured coating width" refers to the lateral, e.g., side-to-side, effective cure width). Coating width varies with the length of the arc lamp(s) on the curing machine. The minimum width is approximately 15 inches (38 cm) to permit the operator to walk behind the machine without stepping in wet coating on either side of the cure path. Lamps of greater length are available as well. Cure width for self-propelled riding machines may be in the range of 30-48 inches (76 to 122 cm).

Overall, improved efficiencies and cost savings reduce installation and maintenance costs a minimum of 50%, including the near elimination of facility and production down time, minimization of the labor cost to apply and maintain surfaces, and reduction in the aggregate cost of coating materials and equipment. In certain embodiments, annual floor maintenance labor costs, including stripping, waxing, buffing, and reapplication of coating, may be reduced by up to 80%. The UV-curable sealant composition features reduced energy consumption for application and maintenance activities as well as emitting zero Volatile Organic Compounds (VOCs) into the atmosphere. Because the UV-curable sealant composition offers no source of nutrient or moisture for mold, mildew and microbial contaminants, it is more sanitary than conventional floor finishes. Some of the cost-saving benefits for a 50,000 square feet (4645 square meters) facility are outlined in Table 3.

TABLE 3

| | Using traditional floor finish | Using the UV-curable sealant composition of the present invention |
|---|---|---|
| Facility Square Footage (Square Meters) | 50,000 sq ft (4645 m$^2$) | 50,000 sq ft (4645 m$^2$) |
| Application Frequency (#per year) | 6 | 0.6 |
| Touch-up Frequency (#per year at 100 sq ft (9.3 m$^2$) per touch up) | 10 | 0.2 |
| Touch-up materials cost (per touch up) | $10 | $ 50 |
| Touch-up Labor cost (per touch up) | $60 | $ 30 |
| Materials cost (per 500 sq ft (46.5 m$^2$)) | $50 | $250 |
| Labor cost (per hour) | $15 | $ 15 |
| Number of technicians (per application or touch up) | 2 | 2 |

TABLE 3-continued

| | Using traditional floor finish | Using the UV-curable sealant composition of the present invention |
|---|---|---|
| Material cost (per application) | $ 5,000 | $25,000 |
| Labor cost (per application) | $ 1,000 | $ 1,000 |
| Annual Cost (Materials and Labor) | $36,700 | $15,516 |

Since the UV-curable sealant composition extends the life of the floor, it also has other environmental benefits, e.g., saving energy and use of compounds, by requiring fewer applications of the coating over the lifetime of the floor and eliminating the needs of constant stripping, waxing and buffing of floors. This reduces time and labor required for regular cleaning and eliminates huge quantities of water contaminated with caustic stripper and pollutants from being released into the environment.

Example 1

Surface Preparation:

For existing floors, the floor was stripped of any residual wax, dirt, soap residues or other contaminants. The floor was allowed to dry before applying coating. For new floors, the floor is vacuumed or dry mopped to remove any dirt, dust or other contaminants. If the surface of the floor appears oily, it is washed with detergent and rinsed thoroughly to remove any residues and allowed to dry.

Ambient Light:

The room should be free of sunlight or other intense light sources. Any windows were masked to prevent sunlight from causing premature gelation of the coating. If the room is lighted by fluorescent lamps, as few fixtures as possible are used to minimize premature gelation.

Application Equipment:

Application equipment is similar to that used for applying wood floor coatings for gymnasiums: For example, a T-bar applicator, available in 12-, 18- and 24-inch widths (30.5 cm, 45.7 cm, and 61 cm, respectively) was used. A woven cover was used to minimize shedding of fibers. For edging, a lightweight 12-inch (30.5 cm) T-bar or a 9-inch (25 cm) sponge backed applicator was used with a woven cover. Roller handles with extensions as well as mixing blade (spiral type) with low-speed drill (600 rpm maximum) may also be used.

Coating Application:

The UV-curable sealant composition is a one-part coating, and does not require addition of hardener or catalyst. However, settling of some of the coating components may occur, particularly in a satin coating. A coating containing 30 weight percent urethane acrylate, 55 weight percent acrylate esters, 5 weight percent precipitated silicon, 4 weight percent micronized polyethylene and 6 weight percent photoinitiator was admixed. The coating was mixed thoroughly using a spiral mixing blade, making sure that any precipitate at the bottom of the container is well dispersed into the coating. The coating was applied along one edge of the space to be coated and allowed to settle for 5-10 minutes. The coating was then cured. This provides a working area over which the cure machine can be moved. A wet edge was maintained at all times to prevent ridges or gaps to occur. Coating was continued around the outside of the room until all the edges have been coated and cured. Beginning at one side of the room, the coating was spread the length of the section, blending the end of each pass into the wet edge from the coating around the outside of the room. The coating was continually spread across the rest of the space. After the coating has flowed out for 5-10 minutes, the coating was cured by starting at the same edge where the first coating was laid down. The coating was continually cured up and down the room parallel to the first pass until the far side of the room is reached.

Example 2

Stain Resistance:

The UV-curable sealant composition provides a durable finish when applied over standard commercial VCT tile and cured using UV (ultraviolet) light. The stain resistance of the UV-cured sealant composition was tested versus a conventional floor polish when both were applied to a commercial VCT tile. The test method used was American Society for Testing and Materials (available on the world wide web at astm.org) (ASTM) D 1308-02.

The UV-curable sealant composition of Example 1 was prepared. The components are added to a mixing vessel and are mixed at 400-800 RPM for 15 minutes. If powdered components are used, they are first mixed at higher speeds of 1600 RPM into a mixture of the acrylic ester monomers, then added to the balance of the formulation. Standard Commercial VCT Tiles were coated with one layer of the UV-curable Sealant composition using a T-bar applicator with nylon bristle cover. The sealant was cured at 10 feet/minute (3 meters/minute) using a floor cure portable UV irradiator with 150 W/inch (2.54 cm) of UV irradiation at a wavelength selected for the particular photoinitiators (i.e., ESACURE KIP 100F and ESACURE KB1). Control samples were prepared by coating commercial VCT tiles with four coats of a conventional floor polish (such as EXCELON™ Floor Polish 403). Each coat was applied and allowed to dry for 30 minutes before the next coat was applied. The surface was buffed after the third and fourth coats, per the manufacturer's recommendations. Stain resistance of the tiles was determined by spotting the surface with a series of common household chemicals or food products. The spots were allowed to stand on the surface of the tile for 15 minutes, and then wiped off. Residual stains were recorded, and then the spot was cleaned with a standard household cleaning agent to determine whether the stain was permanent. The chemicals tested were as follows: 1. Ketchup, 2. Mustard, 3. Vinegar, 4. Canola oil, 5. Grape juice, 6. Gum remover (mineral spirits, citrus oil and organic detergent), 7. Nail polish remover (acetone, water and propylene carbonate), 8. Isopropyl rubbing alcohol, 9. Bleach (full-strength sodium hypochlorite laundry bleach), and 10. BETADINE® disinfectant.

Results and Discussion:

Application of the staining agents to the VCT tiles showed one immediate difference between the conventional floor polish and the UV-cured sealant composition. All of the staining agents spread readily across the polish surface, increasing the contact area. In contrast, the staining agents remained as compact spots on the UV-cured sealant composition. This is due to the high degree of cross-linking of the UV-cured sealant composition surface and its lower surface energy. Since the staining agents did not spread, cleanup was improved compared to the conventional floor polish. In addition, chemical agents such as rubbing alcohol or nail polish remover had no effect on the UV-cured sealant composition coating, and in fact began to evaporate from the surface harmlessly. The effects of some staining agents tested are summarized in Table 4.

TABLE 4

| Staining Agent | UV-cured composition of the present invention immediately after removal | UV-cured composition of the present invention after cleaning | Conventional composition immediately after removal | Conventional composition after cleaning |
|---|---|---|---|---|
| Ketchup | No effect | No effect | Loss of gloss | Loss of gloss |
| Mustard | Faint yellow stain | Removed - no loss of gloss | Faint yellow stain | Removed - loss of gloss |
| Vinegar | No effect | No effect | No effect | No effect |
| Canola Oil | No effect | No effect | Loss of gloss - coating softened | Loss of gloss - coating softened |
| Grape Juice | No effect | No effect | Faint purple stain | Removed - loss of gloss |
| Gum Remover | No effect | No effect | Loss of gloss | Loss of gloss |
| Nail Polish Remover | No effect | No effect | Polish removed from surface. | Same as before cleaning |
| Rubbing Alcohol | No effect | No effect | Polish removed from surface. | Same as before cleaning |
| Bleach | No effect | No effect | Loss of gloss | Loss of gloss |
| Betadine ® | Faint orange stain | Removed - no loss of gloss | Polish removed from surface. | Residual stain, loss of gloss |

Based on the results obtained, the UV-cured sealant composition provides a more stain-resistant finish than conventional floor polish. The chemical resistance of the UV-cured sealant composition allows the use of more aggressive cleaning agents when stains like mustard or BETADINE® do penetrate into the surface of the sealant. This ensures that the floors coated with the UV-cured sealant composition will remain free of unsightly stains much longer than those coated with conventional polish.

Example 3

The coefficient of friction of the UV-cured sealant composition on VCT tiles was tested. Two samples of the UV-cured sealant composition were tested in triplicate under laboratory conditions of 22° C. and 61% and 62% relative humidity. The evaluations were conducted in accordance with the American Society for Testing and Materials (ASTM), Method D 2047 utilizing a James Machine fitted with leather sole material under dry and wet surface conditions. A coefficient of friction value of about 0.5 or greater means that a walking surface is slip resistant. Under dry surface conditions, the coefficient of friction of Sample 1 (averaged over four cycles) was determined to be 0.44, 0.60, and 0.63. The coefficient of friction of Sample 1, as averaged over 12 cycles, was 0.56 under dry conditions. Under wet surface conditions, the coefficient of friction of Sample 1 (averaged over four cycles) was determined to be 0.63, 0.64, and 0.63. The coefficient of friction of Sample 1, as averaged over 12 cycles, was 0.63 under wet conditions. Under dry surface conditions, the coefficient of friction of Sample 2 (averaged over four cycles) was determined to be 0.65, 0.62, and 0.60. The coefficient of friction of Sample 2, as averaged over 12 cycles, was 0.62 under dry conditions. Under wet surface conditions, the coefficient of friction of Sample 2 (averaged over four cycles) was determined to be 0.75, 0.73, and 0.70. The coefficient of friction of Sample 2, as averaged over 12 cycles, was 0.72 under wet conditions. As such, the UV-cured sealant on VCT tiles was determined to be slip resistant.

Exemplary embodiments of the present invention are described above. Those skilled in the art will recognize that many embodiments are possible within the scope of the invention. Other variations, modifications, and combinations of the compositions and methods described and illustrated herein can certainly be made and still fall within the scope of the invention. Any embodiment, as well as any feature mentioned, may be used with any other embodiment or any other feature. Thus, the invention is limited only by the following claims and equivalents thereto.

What is claimed is:

1. A sealant composition consisting of an admixture of about 15-35 weight percent of aliphatic and/or alicyclic urethane acrylates, about 40-70 weight percent of acrylate esters, about 0.5-10 weight percent precipitated silica, and about 3-8 weight percent photoinitiator.

2. The sealant composition of claim 1, wherein the sealant composition comprises one part sealant.

3. The sealant composition of claim 1, wherein the sealant composition is able to form a tough and elastic film on a VCT surface upon its application to a VCT surface and after UV curing at a wavelength reactive with the photoinitiator so as to initiate curing of the UV-curable sealant composition.

4. The sealant composition of claim 1, wherein the sealant composition remains liquid in the absence of UV-curing.

5. The sealant composition of claim 1, wherein the sealant composition is free of volatile organic compounds.

6. The sealant composition of claim 1, wherein the sealant composition is free of water.

7. The sealant composition of claim 1, wherein the sealant composition when cured forms a tough, abrasion-resistant film that bonds tightly to vinyl composition tile or other resilient flooring products.

8. The sealant composition of claim 1, wherein the sealant composition bonds tightly to vinyl composition tile or other resilient flooring products.

9. A one part UV-cured sealant composition consisting of about 15-35 weight percent of urethane acrylate, about 40-70 weight percent of acrylate ester, about 0.5-10 weight percent precipitated silica, and about 3-8 weight percent photoinitiator, wherein the one part UV-cured sealant composition has been applied to a surface and subsequently cured by UV-radiation at a wavelength that initiates said photoinitiator to cure the UV-cured sealant composition.

10. The one part UV-cured sealant composition of claim 9, wherein the UV radiation has a wavelength of about 240 nm to about 400 nm.

11. The UV-cured sealant composition of claim 9, wherein the UV-cured sealant composition is able to form a slip resistant coating when applied on a vinyl composite tile surface.

12. The UV-cured sealant composition of claim 9, wherein the one part cured sealant is stain resistant, solvent resistant, and abrasion resistant.

13. The UV-cured sealant composition of claim 9, wherein the one part cured sealant allows for removal of stains without loss of gloss.

14. A method of making the one part sealant composition of claim 2, the method comprising:
   admixing 15-35 weight percent of urethane acrylate, 40-70 weight percent of acrylate ester, 0.5-10 weight percent of precipitated silica, and 3-8 weight percent of photoinitiator.

15. A method of applying a one part sealant composition to a vinyl composite tile (VCT) floor, the method comprising:
   depositing the one part sealant composition of claim 2 onto a surface, wherein the one part sealant composition consisting of about 15-35 weight percent of urethane acrylate, about 40-70 weight percent of acrylate ester, about 0.5-10 weight percent precipitated silica, and about 3-8 weight percent photoinitiator; and
   substantially curing one part sealant composition upon the VCT floor utilizing UV radiation.

16. A method of increasing the life of vinyl composite tile (VCT) flooring, the method comprising:
   preparing a VCT floor for application of a one part sealant composition;
   substantially eliminating sunlight or other intense light sources from the room from the room;
   depositing the one part sealant composition of claim 2 onto a VCT floor, wherein the one part sealant composition consists of 15-35 weight percent of urethane acrylate, 40-70 weight percent of acrylate ester, 0.5-10 weight percent of precipitated silica, and 3-8 weight percent of photoinitiator; and
   curing one part sealant composition upon the VCT flooring utilizing UV radiation, thus sealing the VCT flooring and extending the VCT flooring's life.

* * * * *

UNITED STATES PATENT AND TRADEMARK OFFICE
CERTIFICATE OF CORRECTION

PATENT NO.        : 8,808,863 B2                                    Page 1 of 1
APPLICATION NO.   : 13/387104
DATED             : August 19, 2014
INVENTOR(S)       : Geoffrey Russell It is certified that error appears in the above-identified patent and that said Letters Patent is hereby corrected as shown below:

In the claims:
CLAIM 15, COLUMN 13, LINES 15-16,   change "consisting" to --consists--

Signed and Sealed this
First Day of September, 2015

Michelle K. Lee
*Director of the United States Patent and Trademark Office*